United States Patent [19]

Backheim

[11] Patent Number: 4,613,299

[45] Date of Patent: Sep. 23, 1986

[54] DEVICE FOR COMBUSTION OF A FUEL AND OXYGEN MIXED WITH A PART OF THE COMBUSTION GASES FORMED DURING THE COMBUSTION

[76] Inventor: Tommy Backheim, Pepparrotsvägen 21, S-230 30 Oxie, Sweden

[21] Appl. No.: 739,047

[22] Filed: May 29, 1985

[30] Foreign Application Priority Data

Jun. 5, 1984 [SE] Sweden ................................ 8403010

[51] Int. Cl.$^4$ ............................................ F23D 11/44
[52] U.S. Cl. .................................. 431/116; 60/39.52; 60/750; 60/517
[58] Field of Search .................. 431/115, 116; 60/750, 60/39.52, 517; 432/222, 21

[56] References Cited

U.S. PATENT DOCUMENTS 762,129 6/1904 Branch .
2,110,209 3/1938 Engels .
3,869,244 3/1975 von Linde et al. .
4,277,942 7/1981 Egnell et al. .
4,287,857 9/1981 Schnitzer ........................ 431/116 X
4,345,426 8/1982 Egnell et al. .................... 431/116 X

OTHER PUBLICATIONS

Swedish pub. appl. 8003953-0 (with translation of Summary), published Jul. 11, 1983.

Primary Examiner—Randall L. Green
Attorney, Agent, or Firm—Finnegan, Henderson, Farabow, Garrett and Dunner

[57] ABSTRACT

A device for combustion of a fuel with substantially pure oxygen using partial recirculation of the combustion gases which has separate ejectors suspended between discs which are in turn connected to a resiliently suspended hub.

7 Claims, 3 Drawing Figures

U.S. Patent  Sep. 23, 1986  4,613,299
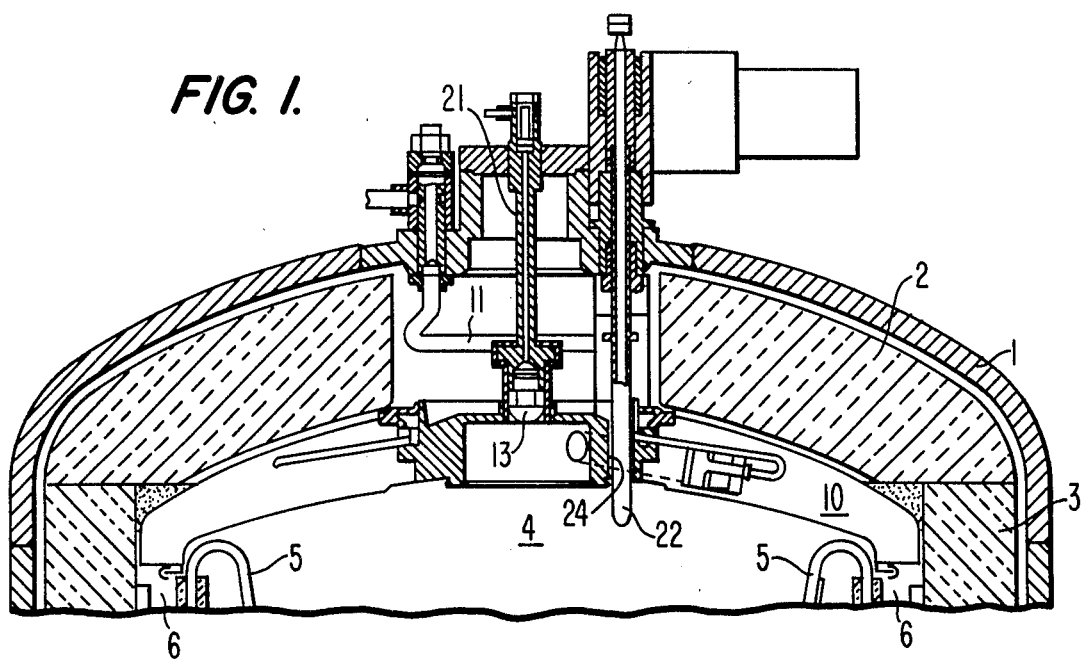
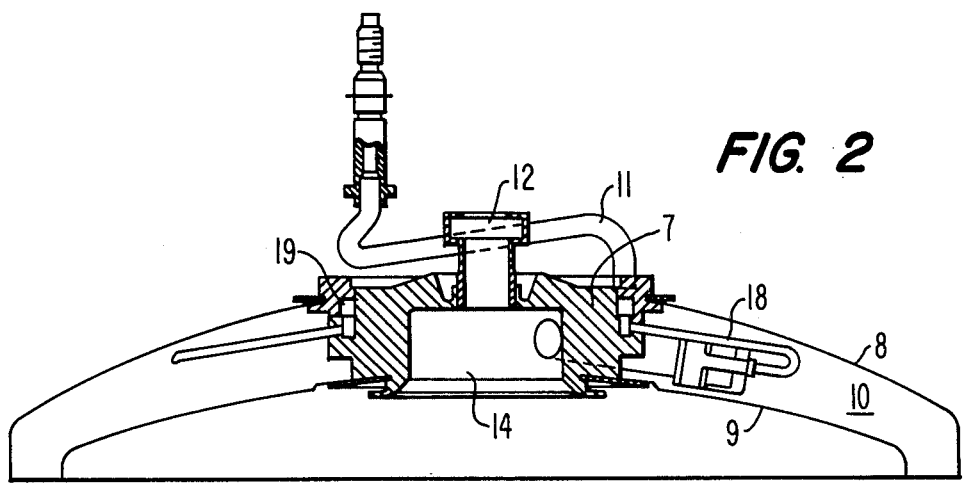
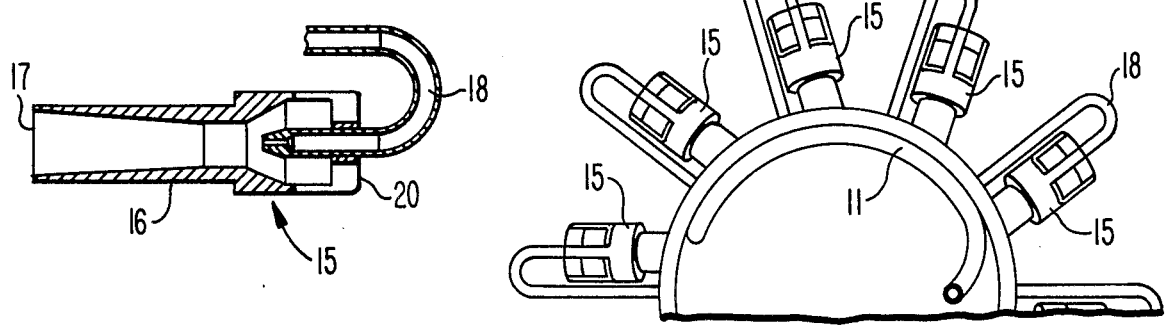

DEVICE FOR COMBUSTION OF A FUEL AND OXYGEN MIXED WITH A PART OF THE COMBUSTION GASES FORMED DURING THE COMBUSTION

BACKGROUND OF THE INVENTION

1. Field of the Invention

This invention relates to a device for combustion of a fuel and oxygen mixed with a part of the combustion gases formed during the combustion.

2. Description of the Prior Art

The Swedish patent specification No. 8003953-0 describes a device for combustion of diesel oil with substantially pure oxygen in a single step and with reduction of the peak combustion temperature by continuous recirculation of a part of the combustion gases after having cooled said gases. The known device comprises a duct for supply of substantially pure oxygen and a duct for leading the combustion gases to a stack. The duct for supply of pure oxygen and the duct for the combustion gases form parts of an ejector the delivery side of which is directed towards a nozzle for supply of diesel oil.

A device of this type is intended to be used in a heat engine—e.g. a Stirling engine—which should be able to operate without supply of air and which thus will be suitable for powering a submarine.

The ducts for delivery of oxygen and for leading combustion gas to the stack have been made integral with the walls limiting the combustion chamber in which a rather high pressure—e.g. 3 Mpa—prevails. The ducts are thus intimately connected to very heavy elements. During operation of the device very large variations in temperature will occur—especially of course during starting up of the device. This will result in variations in the relative positions of the ducts and cause errors in the recirculation of the combustion gases.

SUMMARY OF THE INVENTION

The object of the present invention is to provide a device of the type referred to above in which temperature variations will have no influence upon the geometry of the ejectors.

In accordance with the present invention, the device for combustion of a fuel and oxygen mixed with a part of the combustion gases formed during the combustion comprises walls defining a generally rotation symmetrical plenum chamber in which the combustion is completed, said walls comprising heater tubes leaving gaps between them through which the combustion gases may leave the chamber, said device also comprising a plurality of ejectors using pure oxygen as a driving gas for sucking in a part of the combustion gas which has passed said gaps between the heater tubes is according to the present invention characterized in that said ejectors are carried by tubes bent approximatley 180 degrees and connected to a hub having an annular oxygen supply channel therein, said hub being carried by an oxygen supply tube and carrying two disc shaped covers leaving a space between them in which said ejectors are located, the outer peripheries of said discs terminating adjacent to an annular combustion gas chamber downstream of said heater tubes.

BRIEF DESCRIPTION OF THE DRAWING

The invention will be described in more detail reference being made to the drawing in which FIG. 1 is a vertical section through a device according to the invention FIG. 2 is a vertical section through a part of the same device FIG. 3 is a section through an ejector used in the device and FIG. 4 is a top view of a part of the device

DESCRIPTION OF THE PREFERRED EMBODIMENT

The reference numeral 1 designates a shroud enclosing a chamber in which a high pressure—e.g. 3 Mpa—may prevail. Heat insulating material 2 and 3 will protect the shroud 1 and prevent heat losses in case a high temperature prevails in the central part 4 of the chamber enclosed by the shroud 1.

Said central part 4 forms a generally rotation symmetrical plenum chamber for the combustion. The plenum combustion chamber 4 is partly limited by heater tubes 5 leaving gaps between them through which the combustion gases formed may leave the chamber 4 and pass into a surrounding annular chamber 6. Said annular chamber 6 is connected to a gas outlet, not shown.

The chamber 4 is also limited by a part of the device shown separately in FIGS. 2 and 4 at a somewhat larger scale than in FIG. 1.

The part shown in FIGS. 2 and 4 comprises a hub 7 carrying two disc shaped covers 8, 9 leaving a space 10 between them. The hub 7 is carried by an oxygen supply tube 11 bent through 90 degrees three times which will make it rather flexible and adapted to withstand thermal stresses. The hub 7 has a vertical, central opening 12 adapted to receive an oil supply nozzle 13 shown in FIG. 1. The hub 7 has also a lower, wider bore 14 communicating with the chamber 4. A number of ejectors 15 are directed into said bore 14 as is the nozzle 13. The ejectors 15 are shown best in FIG. 4, the details being shown best in FIG. 3.

Each ejector 15 comprises a venturi tube 16 having its delivery opening 17 directed to be off-set from the central vertical axis of the hub 7 so as to produce a swirl in the chamber 14. Oxygen, used as a driving gas is supplied through a tube 18 which is bent through 180 degrees and connected to the hub 7. The tube 18 is in connection with an annular oxygen chamber 19 in the hub 7, said chamber 19 being connected to the tube 11. The tube 18 is very flexible and may be exposed to varying temperatures without causing severe stresses on the ejector 15 although the delivery end 17 of the tube 16 may be connected rigidly to the hub 7. Any deformations or angular displacements of the suspension of the ejector 15 will have no influence upon its function.

The ejectors 15 will suck in combustion gases through the rear ends 20 of the venturi tubes 16.

The combustion gases formed in the combustion chamber 4 will pass between the tubes 5 into the chamber 6 and be cooled off substantially—e.g. from 1,400° C. to 800° C. Some of the cooled gases will now be sucked into the space 10 from the chamber 6.

It will be understood that the part of the device shown in FIG. 2 is suspended only by the tube 11. The device is also guided by the nozzle 13 which, however, is supported by a rather long and flexible tube 21.

Finally the outer periphery of the covers 8 and 9 are guided by the tubes 5 and the insulation 3, but such guiding will allow substantial relative movements without causing mechanical stresses.

The reference numeral 22 in FIG. 1 designates a retractable heater plug adapted to be used for ignition during starting-up of the engine. Hub 7 includes aperture 24 for receiving the inserted heater plug 22.

During normal operation of the engine the parts increasing their temperature during starting up will be exposed to deformations and changes in relative positions.

However, any such deformations will have no influence upon the function and the reliability of the device. The two covers 8 and 9 may be deformed several millimeters but retain their proper function of leading part of the gas from the chamber 6 back to the combustion chamber 4. The tubes 11 and 21 are able to follow movements of the hub 7. The ejectors 15 may be exposed to changes in their directions due to movements of the tubes 18, but their main object—to provide a predetermined proportion of oxygen and recirculated combustion gas—will remain unaltered.

I claim:

1. A device for combustion of fuel admitted from a fuel supply and oxygen admitted from an oxygen supply and mixed with a part of the combustion gases formed during the combustion, said device comprising a shroud, walls defining a generally rotation-symmetrical plenum chamber within said shroud in which the combustion is completed, said walls comprising heater tubes leaving gaps between them through which the combustion gases may leave the plenum chamber, an annular chamber surrounding the plenum chamber for receiving the combustion gases, and device also comprising a fuel nozzle communicating with the fuel supply, and a plurality of ejectors surrounding, and directed toward, said fuel nozzle and using pure oxygen as driving gas for sucking in, and mixing with, a part of the combustion gas which has passed said gaps between the heater tubes, said device further comprising an oxygen supply tube communicating with said oxygen supply and attached to said shroud and extending into said chamber; a hub supported by said oxygen supply tube and having an annular oxygen supply channel in flow communication with said oxygen supply tube; a plurality of ejector support tubes, said support tubes being bent approximately 180 degrees and connected to said hub and communicating with said annular oxygen supply channel therein, said tubes also being connected to support respective ejectors at ejector ends distant said fuel nozzle, said hub being carried by said oxygen supply tube; and two disc shaped covers mounted on said hub and leaving a space between them in which said ejectors are located, the outer peripheries of said discs terminating adjacent to, and communicating with, said annular combustion gas receiving chamber downsteam of said heater tubes relative to the combustion gas flow direction, said space between said discs forming the combustion gas flow path to said ejectors.

2. The device according to claim 1 characterized in that the ends of said ejectors remote from the tubes are additionally vertically positioned by said hub.

3. The device according to claim 1 wherein said fuel nozzle is connected to said shroud by a flexible fuel tube, and wherein said hub is horizontally positioned by said fuel nozzle extending through an opening in said hub.

4. The device according to claim 1 wherein the outer peripheries of said disc shaped covers are guided in part by said heater tubes.

5. The device according to claim 1 further comprising a heater plug retractably insertable into said plenum chamber for initiating combustion in said device, wherein said hub includes an aperture for receiving said inserted heater plug.

6. The device according to claim 1 wherein said oxygen supply tube is bent to render it flexible to accommodate thermally induced stresses.

7. The device according to claim 1 wherein said hub includes a central bore into which said fuel and said mixed oxygen and combustion gas are delivered.

* * * * *